United States Patent [19]
Weiser et al.

[11] Patent Number: 5,982,507
[45] Date of Patent: Nov. 9, 1999

[54] METHOD AND SYSTEM FOR GENERATING IN A HEADERLESS APPARATUS A COMMUNICATIONS HEADER FOR USE IN ROUTING OF A MESSAGE

[75] Inventors: Russel F. Weiser, Springville; Douglas Max Grover, Elk Ridge; Blaine Stewart Dennis; William Earl Rieske, both of Orem, all of Utah

[73] Assignee: Novell, Inc., Provo, Utah

[21] Appl. No.: 08/818,510

[22] Filed: Mar. 14, 1997

Related U.S. Application Data

[60] Provisional application No. 60/013,521, Mar. 15, 1996.

[51] Int. Cl.[6] ...................................................... H04N 1/00
[52] U.S. Cl. ........................... 358/438; 358/402; 358/403; 358/407; 358/440; 358/442; 358/444; 358/468; 379/93.02; 380/48
[58] Field of Search ..................... 358/438, 402, 358/403, 462, 401, 406; 395/162, 134, 164, 600

[56] References Cited

U.S. PATENT DOCUMENTS

| | | | |
|---|---|---|---|
| 4,905,282 | 2/1990 | McGlynn et al. | 380/48 |
| 4,953,210 | 8/1990 | McGlynn et al. | 380/48 |
| 5,200,993 | 4/1993 | Wheeler et al. | 379/93.02 |
| 5,206,743 | 4/1993 | Hochman et al. | 358/440 |
| 5,291,546 | 3/1994 | Giler et al. | 358/402 |
| 5,309,555 | 5/1994 | Akins et al. | 340/706 |
| 5,384,835 | 1/1995 | Wheeler et al. | 358/442 |
| 5,438,433 | 8/1995 | Reifman et al. | 358/468 |
| 5,461,488 | 10/1995 | Witek | 358/444 |
| 5,488,651 | 1/1996 | Giler et al. | 358/407 |
| 5,535,527 | 7/1996 | Shibata et al. | 30/9 |
| 5,619,649 | 4/1997 | Kovnat et al. | 395/147 |
| 5,630,079 | 5/1997 | McLaughlin | 345/902 |
| 5,682,540 | 10/1997 | Kiotz, Jr. et al. | 395/144 |
| 5,696,599 | 12/1997 | Tiso | 358/434 |

OTHER PUBLICATIONS

Novell, Inc., *Intelligent FAX with NEST Autoroute*, Slide Presentation, Russel F. Weiser, Mar. 20, 1995.
Novell, Inc., *Novell Acquires Fax Routing Technology*, Press Release, Apr. 25, 1995.
Novell, Inc., *Nest Autoroute Marketing Brochure*, Mar. 20, 1995.
Novell, Inc., *Nest Autoroute Slide Presentation*, Mar. 20, 1995.
Novell, Inc., *Nest Office Solutions Slide Show*, Mar. 18, 1996.

*Primary Examiner*—Christopher S. Kelley
*Assistant Examiner*—Sheela Chawan
*Attorney, Agent, or Firm*—Dinsmore & Shohl LLP

[57] ABSTRACT

A method and system from integrating a headerless apparatus into a messaging environment. The method and system enable message routing capabilities to and from conventionally headerless apparatus, such as scanners and digital copiers. The apparatus work in conjunction with a document router to provide full-featured and secure message routing capabilities, including scanning images directly to an electronic mailbox, and retrieving messages from within the messaging environment for output at the apparatus.

25 Claims, 9 Drawing Sheets

FIG. 9

METHOD AND SYSTEM FOR GENERATING IN A HEADERLESS APPARATUS A COMMUNICATIONS HEADER FOR USE IN ROUTING OF A MESSAGE

RELATED APPLICATION

This application claims the benefit of U.S. Provisional Application Ser. No. 60/013,521 filed Mar. 15, 1996, which is hereby incorporated herein by reference.

FIELD OF THE INVENTION

This invention relates generally to message transmission in a messaging environment, and more particularly relates to a method and system for integrating headerless apparatus into a messaging environment and the control of message transmission from such apparatus.

BACKGROUND OF THE INVENTION

The phrase 'messaging environment' will be used herein to refer to computer networks, and one of their primary functions—the transfer of messages such as files, documents and other information from one location to another. Much of the software in use in a computer network is devoted to the task of such message transfer, such as electronic mail (e-mail) services, for example. Electronic mail has developed into one of the easiest and most popular ways to transfer information from one location to another, and from one user to another. Other products, such as group productivity software, are enjoying increasing sales because of their ability to provide even more functionality in the transfer of information among users of a network than provided by a basic e-mail system.

In conventional messaging environments, there exists a class of peripherals, such as scanners and digital copiers, which can be used to indirectly input or print messages from the messaging environment. Scanners are input devices and used to digitize analog images, while digital copiers are both input and output devices, being capable of not only digitizing analog images, but also of outputting a digitized image received from a computer. These devices have become increasingly popular as they provide the ability to transform analog data into a format suitable for transmission or modification in a computing environment. Scanners are conventionally not network aware, and communicate with the messaging environment indirectly via a client computer to which the apparatus is coupled. The client computer, in turn, is coupled to the network and can transfer messages received from a peripheral to a location in the messaging environment. Digital copiers, too, are rarely network aware, and in the few available network-aware digital copiers, their ability to communicate with a network is limited to acting solely as an output device, such as a printer.

Scanners and digital copiers conventionally have been coupled directly to a client computer, because the initial use of such devices was to input a graphic image, such as a drawing or photograph, and manipulate the image on a particular computer. Such manipulation and use was accomplished by fairly specialized personnel, and was not an ability needed by many people. Thus, there was little need to couple such devices directly to a network. As computing environments have become graphically oriented, the ability to use graphic images has become widespread and fairly easy through the use of graphics software. Even conventional word processors today provide fairly sophisticated image manipulation tools which were found only in very specialized graphics programs a few years ago. Yet, devices such as scanners and digital copiers continue to require client computers to communicate with the network environment, and have no ability to route messages to and from the messaging environment.

Another apparatus which has become almost indispensable for its ability to transmit data to remote locations is the facsimile processor. Facsimile capabilities are frequently implemented in computer environments through the use of a facsimile board and facsimile software, which handle sending a message from within the messaging environment over a telephone line to a remote facsimile processor, or receiving a message from a remote facsimile processor and storing the message on a disk drive. Unlike conventional headerless apparatus, such as scanners and digital copiers, all facsimile processors must be capable of generating a communications header for use in message transmission with another facsimile processor. The existence of such a communication header in facsimile processors has been used as a mechanism for implementing rudimentary message routing capabilities in a facsimile processor. U.S. Pat. No. 5,206,743 to Hochman et al., the entirety of which is hereby incorporated herein, discloses the use of the TSI field from a communications header to specify an intended recipient of the message. The receiving facsimile machine, through the use of facsimile software running on a network server, extracts a user identifier from the TSI field, and stores the message in a directory associated with the user on a network server. The user can then run specialized software from their network-attached computer to read the message.

Given the popularity of headerless apparatus such as scanners and digital copiers, it would be beneficial if such apparatus could be integrated with a messaging environment such that a message could be directly routed from a scanner to an application within the messaging environment, or a message could be routed from a location within the messaging environment directly to a digital copier, for example. However, unlike facsimile processors, such apparatus lack the ability to create a communications header. Moreover, like conventional facsimile processors, no mechanism exists for comprehensive control of a messaging environment such as directing messages into and from the messaging environment, from the apparatus itself. If such devices could be integrated into the messaging environment, advanced routing capabilities allowing flexible control of messages into and from the messaging environment could be achieved, and the use of a client computer would not be necessary, decreasing the overall costs of such peripherals while increasing their functionality and overall integration into the messaging environment.

SUMMARY OF THE INVENTION

It is one object of this invention to provide a method and system for generating in a headerless apparatus a communications header for use in the routing of a message.

It is another object of this invention to provide a method and system for integrating scanners and digital copiers into a messaging environment.

It is yet another object of this invention to provide a method and system for implementing routing capabilities in a conventional headerless apparatus.

It is still another object of this invention to provide a method and system for directing a scanned image via a scanner to any of a plurality of locations within a messaging environment.

It is yet another object of this invention to provide a method and system for retrieving, from a digital copier, a message from any of a plurality of locations within a messaging environment.

Additional objects, advantages and other novel features of the invention will be set forth in part in the description that follows and, in part, will become apparent to those skilled in the art upon examination of the invention. To achieve the foregoing and other objects and in accordance with the purposes of the present invention as described above, a method and system for integrating a headerless apparatus into a messaging environment is provided. The method includes coupling an apparatus to a network and providing the apparatus with an input interface such as an entry keypad. The apparatus is provided with a processing module which is operative to receive user-entered transmission data from the entry keypad. The processing module generates a communications header and inserts the transmission data into the communications header. The communications header is transferred from the apparatus to a document routing module located within the messaging environment, which, as a function of the user-entered transmission data, performs one of a plurality of different tasks within the messaging environment.

The user-entered transmission data can include a user identifier which the document router uses to determine which particular task to perform. According to another embodiment of this invention, the user-entered transmission data can include a function code, which specifies which particular task to perform. Certain tasks can require entry of a security code which the document router can validate against a predetermined security value associated with the specified user.

The apparatus can route scanned images to locations within the messaging environment such as a particular storage location within a network server, a specified user's electronic mailbox, another peripheral such as a facsimile processor, or an application, for example. Similarly, a user of the apparatus can request that messages be sent to the apparatus from any such location within the messaging environment. The document router, in conjunction with the processing module in the apparatus, manages the routing of a message to and from the apparatus and a particular location within the messaging environment, and can use a directory services database to determine various attributes associated with the specified user for routing purposes. For example, the document router can extract a user identifier from the communications data field and access the directory services database to determine the particular storage location on a server for that user, the default routing action to take for that user, or the electronic mailbox associated with that user.

Still other objects of the present invention will become apparent to those skilled in this art from the following description wherein there is shown and described preferred embodiments of this invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings.

Reference will now be made in detail to preferred embodiments of the invention, examples of which are illustrated in the accompanying drawings, wherein like numerals indicate the same elements throughout the views.

DETAILED DESCRIPTION

Figure 1:
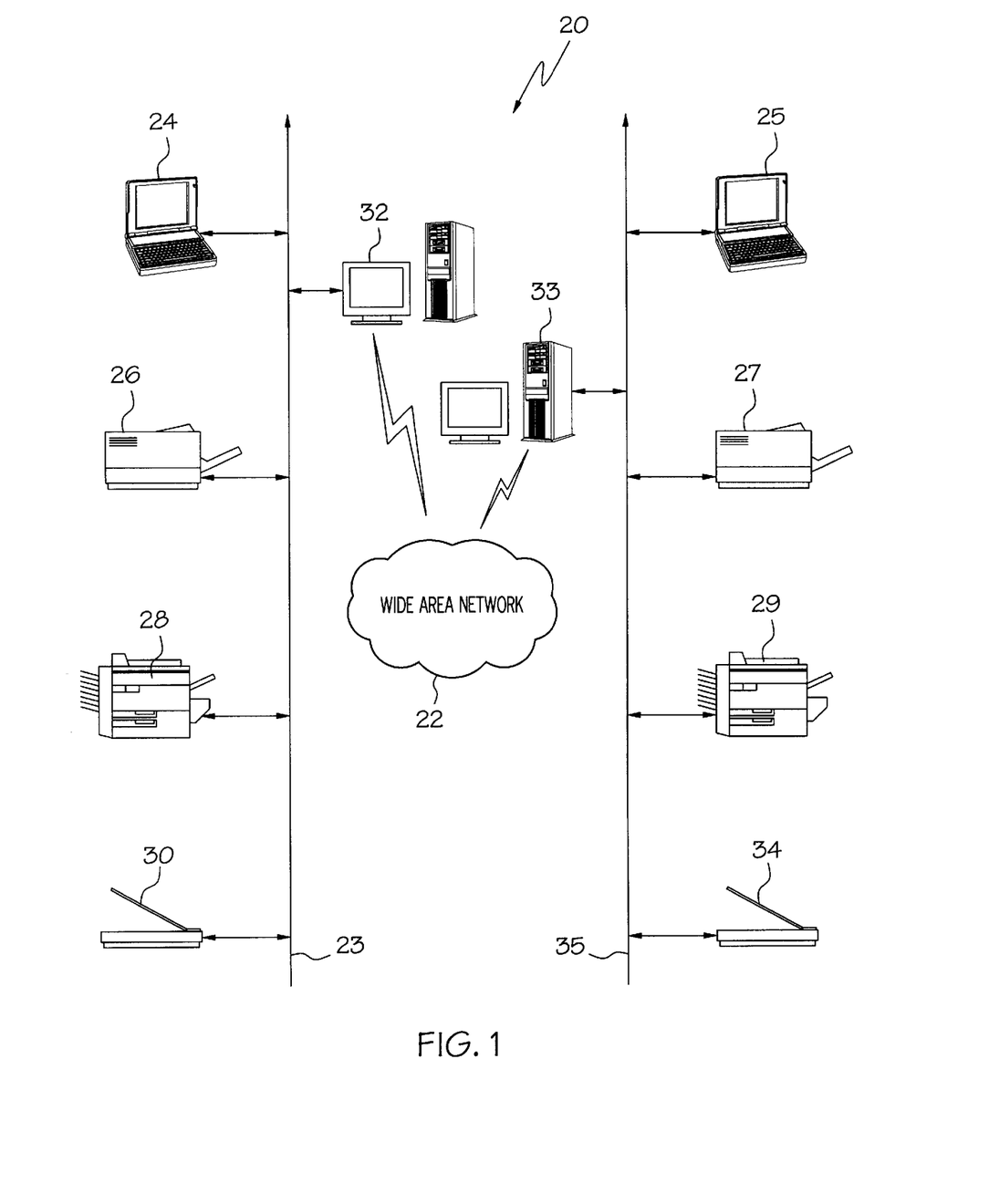
FIG. 1 is a schematic view of a messaging environment according to one embodiment of this invention.

FIG. 1 shows a messaging environment 20 according to one embodiment of this invention. The phrase 'messaging environment' refers to a network in which a message, such as a file, a document or the like can be transmitted over the network. As used herein, the word message is used to refer to a unit of data which can be transferred within a networking environment, such as an e-mail message, an image, a file, a document, a record, and the like. Local area networks (LAN) 23, 35 contain various conventional network-attached apparatus such as network servers 32, 33 client computers 24, 25 and printers 26, 27, as well as apparatus which are not conventionally network-attached, such as digital copiers 28, 29 and scanners 30, 31. Networks 23, 35 can comprise any suitable communications technology such as Ethernet, Token-Ring, FDDI and the like, and any suitable networking topology such as IPX/SPX, TCP/IP and the like. Networks 23 can communicate with one another over a conventional wide area network 22.

The method and system according to this invention integrate conventionally headerless apparatus into messaging environment 20 in part by implementing a communications header in the apparatus, such as scanner 30 and digital copier 28, and coupling such apparatus to network 23 to enable remote control and selective management of routed information from scanner 30 or digital copier 28 within messaging environment 20. The phrase 'headerless apparatus' refers to scanning devices, such as scanners and digital copiers, which are capable of message input, and which conventionally do not have the capability of generating a communications header, as described herein. A communications header can comprise a string, data structure, or the like which can be used to communicate user-entered transmission data from an apparatus such as scanner 30 and digital copier 28 to another module, such as document router 60. According to one embodiment of this invention, a user can, for example, input a document into scanner 30 and enter through the use of a keypad transmission information directing that the document be delivered to a particular peripheral, such as printer 26, a particular storage location within network server 32, or a particular application such as an electronic mailbox of a user of messaging environment 20. As another example, a user could enter transmission data at digital copier 28 to request that all unopened e-mail messages of the user be transferred from within messaging environment 20 to digital copier 28. According to this invention, message transmission can include directing messages to and from a remote local area network, such as network 35 via WAN 22.

Information which can be entered at scanner 30 or digital copier 28 by a user of the messaging environment can include one or more of a user identifier, a function code, an argument, a security code, and a document identifier. If only a user identifier is entered, the document router, as described in more detail below, can access a system database to determine which function, or routing task, should be performed for this user by default. A user can also specify a particular routing task through the use of a function code. Some functions can require arguments. For example, a function code of 03 might be used to indicate that a document being scanned in at scanner 30 should be printed at printer 27. An argument code of 02 can be used to indicate 2 printouts should be made. Certain function codes can require that a security code value be entered before the task will be performed. For example, a function code of 12 might be used to request that the user's e-mail messages be forwarded to the device from which the request was made. Before this will occur, the document router will ensure that a security code was entered, and that the security code matches the security code which messaging environment 20 contains for that user. A document identifier (documented) can be used to signify which particular document should be routed. The document router can be responsible for assigning documents a unique identifier which can then be used by a user to specify a particular document.

Some examples of functions, or routing tasks, performed by messaging environment 20 according to one embodiment of this invention are provided in Table 1, below. Certain functions, such as those which involve message output at a particular apparatus, will not be supported at an input-only device such as scanner 30.

TABLE 1

| Function | Action |
|---|---|
| 00 | Route with e-mail delivery (default). An override or an additional action may be indicated in an attribute maintained in the directory services which indicates that image data over a specified size is not placed in the e-mail system but rather stored in a document storage area of the network, and an e-mail message can be generated to inform the intended recipient of the location and file name of the message. |
| 01 | Route with e-mail delivery and notification message. This function is used to route with e-mail delivery, and includes a notification to the user that a message has arrived. The notification defaults to sending a broadcast message to a user screen. Additional notification methods may be sent based on arguments, which can be suffixed to the function code. For instance, if the notification requires paging, the document router can access from the directory services a pager number associated with the user. |
| 02 | Route to document store. Store image data and notify specified user of image location via e-mail. The e-mail notification will indicate the location and file name of the document for later retrieval. The location of the document storage area can be determined from the directory services entry for this user. |
| 03 | Selective printing. Can require an argument field for a number of copies. Example: an argument 05 means print 5 copies. Printer which should be used can be specified in the directory services entry for the recipient. |
| 10 | Retrieve list of documents. An argument of 01 returns a list of all unopened faxes associated with the user identified in the user identifier field. An argument field of 02 returns the list of all faxes for that user received today. An argument field of 03 returns a list of all e-mail messages for that user. An argument field of 04 returns a list of all unopened e-mail messages for that user. The returned lists include documentids for each message listed. |
| 11 | Retrieve document from document storage. This function requests that a document based on a 4-digit documentid in the document identifier field be sent to the apparatus from which the request originated, such as a digital copier. |
| 12 | Retrieve e-mail messages. This function requests that one or more e-mail messages be sent to the apparatus from which the request originated. For retrieval of a single message, a 4-digit documentid can be entered in the document id field. An argument field of 03 requests that all e-mail messages for that user be retrieved. An argument field of 04 requests that all unopened e-mail messages for that user be retrieved. |
| 13 | Retrieve daily calendar for that user. Retrieves daily calender for the specified user. A security code is required. If documentid field is absent, retrieve today's calendar. Documentid field can be used to specify a particular month and day. |
| 14 | Retrieve daily tasks for that user. Retrieves daily tasks for the specified user. If documentid field is absent, retrieve today's tasks. Documentid field can be used to specify a particular month and day. |
| 20 | Enable/disable proxy services. Allows a user to indicate that proxying of messages is enabled or disabled. Argument field of 01 is enable, 00 is disable. Security code is required. Proxying relates to the ability of predetermined users of the messaging enviromnent having access to another user's messages. This function enables or disables the predetermined users from having such access. |
| 21 | Follow me enable/disable services. Allows a user to indicate that messages should be sent to a predetermined location. Argument field of 01 is enable, 00 is disable. Security code is required. The predetermined location can be specified in the directory services entry for this user. |
| 26 | Relay broadcast. Requires the entry of a security code. User enters a predetermined group routing id in the user identifier field. The group routing id refers to a list of user identifiers. The group routing identifier entry in the directory services includes attributes for time or date and frequency of broadcast. An attribute in directory services for each individual user identified in the group list indicates routing information for the message, such as e-mail location, or fax number. |
| 27 | Time delayed relay broadcast by time on current day. Similar to function 26 except argument field contains the time of day to broadcast the message in a 24 hour clock. |
| 28 | Day of month delayed relay broadcast by date within current month. Similar to function 26, except argument field specifies the day of the month to broadcast, using the values 1–31. |
| 29 | Polling store/retrieve (requires a valid documentid). Provides a means of placing a document into a storage location for later retrieval based on the documentid. An argument field of 01 retrieves a document associated with a specified documentid. An argument field of 99 stores the document in a predefined "polling" storage location with a documentid that is input by a user. |

The functions described in Table 1 merely provide a limited subset of examples of types of routing tasks, and values which could be used to identify such routing tasks. It is apparent that many other routing tasks could be defined for use in the present invention.

Figure 2:
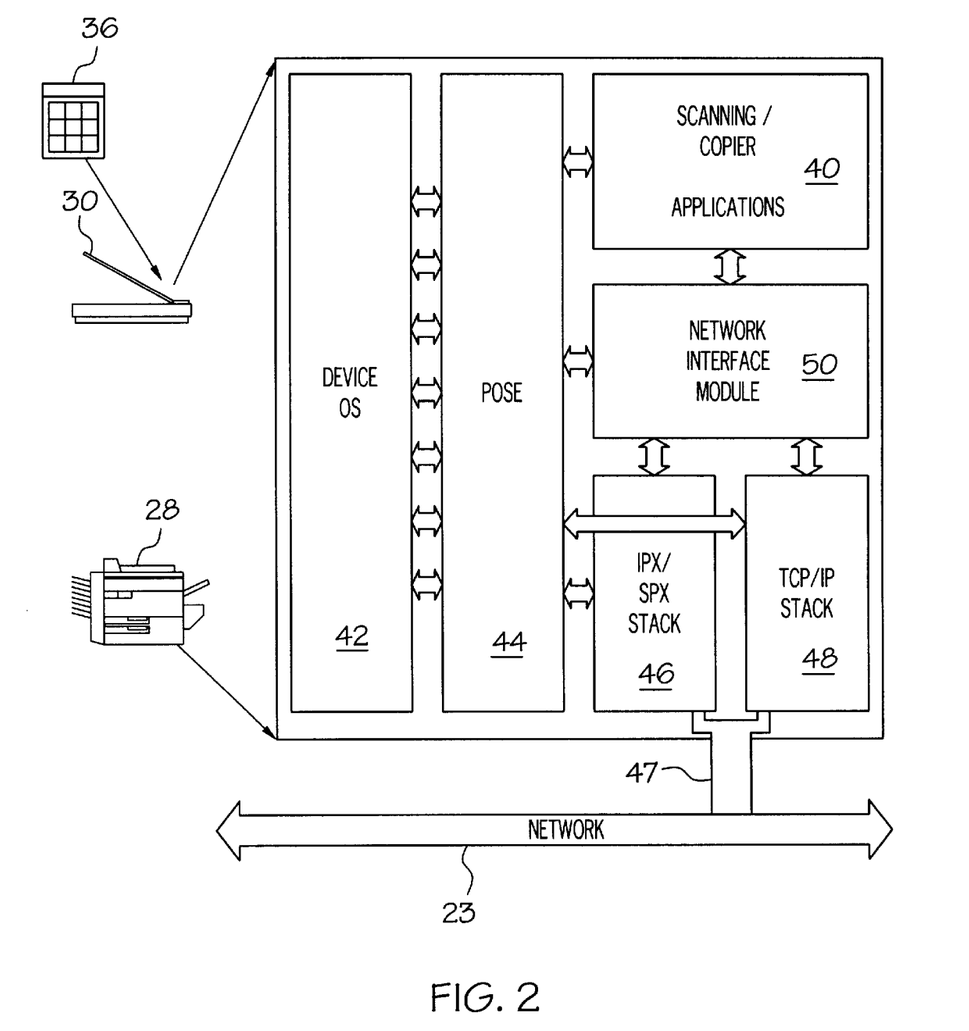
FIG. 2 is a block diagram showing various components in a headerless apparatus used to generate a communications header, and integrate the apparatus into a messaging environment, according to one embodiment of this invention.

FIG. 2 is a block diagram showing various components used in digital copier 28 and scanner 30 to generate a communications header, and integrate the apparatus into messaging environment 20. Scanner 30 and digital copier 28 are each provided with a keypad 36 for entry of transmission data, such as a user identifier identifying a user of messaging environment 20. As described in more detail herein, the user identifier can be used by messaging environment 20 to determine which one of a plurality of different routing tasks are to be performed. According to another embodiment of this invention, the transmission data also includes a function code, which specifies a particular routing task, of a plurality of routing tasks, which should be performed. The transmission data entered by the user can also include a security code value for verification that the user of scanner 30 has the authority to perform the particular routing task requested. Scanner 30 and digital copier 28 are coupled to network 23 via a conventional network adapter such as transceiver 47. Transceiver 47 can comprise any conventional network adapter such an Ethernet or token ring adapter, which is suitable for coupling a device to a communications channel.

Data is communicated to and from transceiver 47 via a conventional network protocol stack such as IPX/SPX stack 46 or TCP/IP stack 48. Communication with such protocol stacks is achieved through a conventional network interface module 50. According to one embodiment of this invention, network interface module 50 comprises a Novell® NetWare® protocol application programming interface (API). A significant portion of the novel functionality provided by scanner 30 and digital copier 28 is embodied in processing module 40, as will be described in detail herein.

The various components can communicate with a device operating system 42 either directly or through an interface layer such as Portable Operating System Extension (POSE) 44. The use of POSE layer 44 is not required, but eases the development of the various components as such modules will not need to be rewritten to interface with each specific device operating system 42. Each of the modules in scanner 30, except for processing module 40, comprises conventional software known to those skilled in the art and will not be discussed in detail herein.

Figure 3:
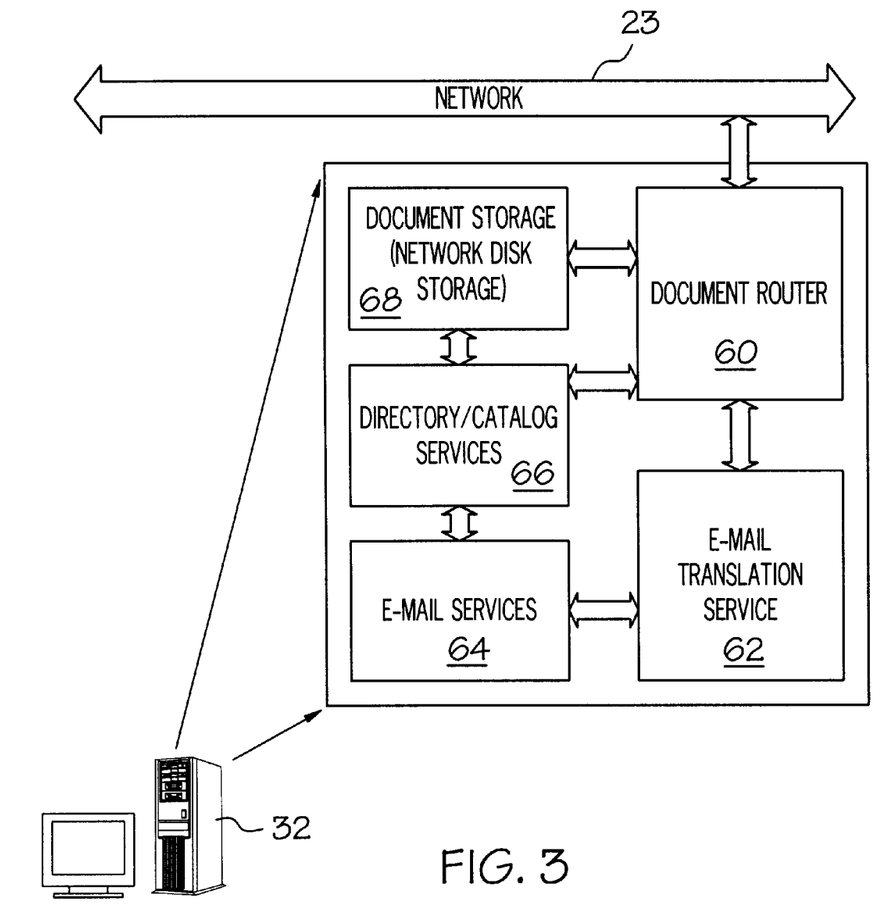
FIG. 3 is a block diagram of a network server containing a document router according to one embodiment of this invention.

Processing module 40 communicates with a document router 60 on network server 32 as described in more detail below. Processing module 40 is also responsible for receiving user-entered transmission data from keypad 31, generating a communications header, and formatting and inserting the user-entered transmission data into the communications header. The communications header can comprise any suitable layout for communicating the items of information, such as the user identifier, the function code, the argument, the security code, and the identifier, as needed, to document router 60. The main consideration is that document router 60 understand the layout, so the correct data can be extracted from the header by document router 60. Processing module 40 communicates the header in a network packet to the document router.

Processing module 40 can be created through either special electronic circuitry, or, more preferably, with a programming language, such as C, C++, JAVA or any other programming language suitable for the particular microprocessor chip used in the respective apparatus. Processing module 40 interacts with network module 50 via conventional API calls which differ among the various network vendors, but which are documented by such vendors and are known to those skilled in the art. A suitable microprocessor for scanner 30 and digital copier 28 can comprise any conventional microprocessor suitable for being embedded in an apparatus such as scanner 30 and digital copier 28, and capable of executing an operating system 42. Keypad 36 can comprise any input command apparatus, or interface, such as a voice recognition module, or a conventional keypad suitable for providing a signal to processing module 40 indicating which key has been depressed. Keypad 36 can provide either or both numeric as well as alphabetic keys. Keypad 36 can also comprise any input mechanism suitable for determining from a user of the apparatus a desired user identifier or routing task within the messaging environment and capable of communicating this information to processing module 40, and could include a windowing user interface or the like.

FIG. 3 is a block diagram showing the various components in network server 32, including document router 60, which work in conjunction with processing module 40 to achieve the integration of headerless apparatus into messaging environment 20 according to one embodiment of this invention. Document router 60 communicates with processing module 40 in scanner 30 or digital copier 28 to provide the functionality of the particular routing task requested from one of such apparatus. Document router 60 interacts with the various messaging components of messaging environment 20 such as persistent storage 68 for storage and/or retrieval of messages, such as documents and/or files, e-mail translation service 62 to interface with electronic mail system 64 to generate and/or retrieve electronic mail messages for a particular user, and directory services 66 to determine specific attributes associated with the user identifier entered at scanner 30 or digital copier 28. Directory services 66 can comprise a simple table of valid user identifiers and various attributes as will be described herein, or can comprise a full-featured directory services database, such as Novell's NetWare Directory Services. Network server 32 can comprise a conventional network server and communicates with network 23 via conventional techniques such as a local area network transceiver and various network protocol stacks, as are known to those skilled in the art.

Document router 60 communicates with processing module 40 and scanner 30 through the use of communication packets and in conjunction therewith performs the particular routing task requested. Routing tasks can include inputting a message at scanner 30 or digital copier 30, and transferring the message to a specific location or application within messaging environment 20, such as electronic mail system 64, persistent storage 68, or even another network peripheral such as printer 27. Messaging tasks can also comprise routing a message from a location within messaging environment 20, such as from electronic mail system 64, or persistent storage 68 to the apparatus from which the request was made, such as digital copier 28. Other tasks can include the ability to affect routing parameters within messaging environment 20, such as enabling or disabling certain routing features. Examples of routing tasks are provided in Table 1, above.

Certain message routing tasks can require the use of a security code to ensure that the individual entering the user identifier has access rights to the requested routing task. For example, if an individual enters a request to transfer electronic mail messages for a particular user from messaging environment 20 to digital copier 28, a security code must be entered and communicated to document router 60 as part of the transmission data. Document router 60 will use the user identifier entered in the transmission data to access directory services 66 and determine the security value associated with that particular user identifier. If the security value entered in the transmission data does not match the security value retrieved from directory services 66, document router 60 will not provide the requested routing task. Document router 60 can also generate and communicate a message to a system administrator regarding a security violation.

Figure 4:
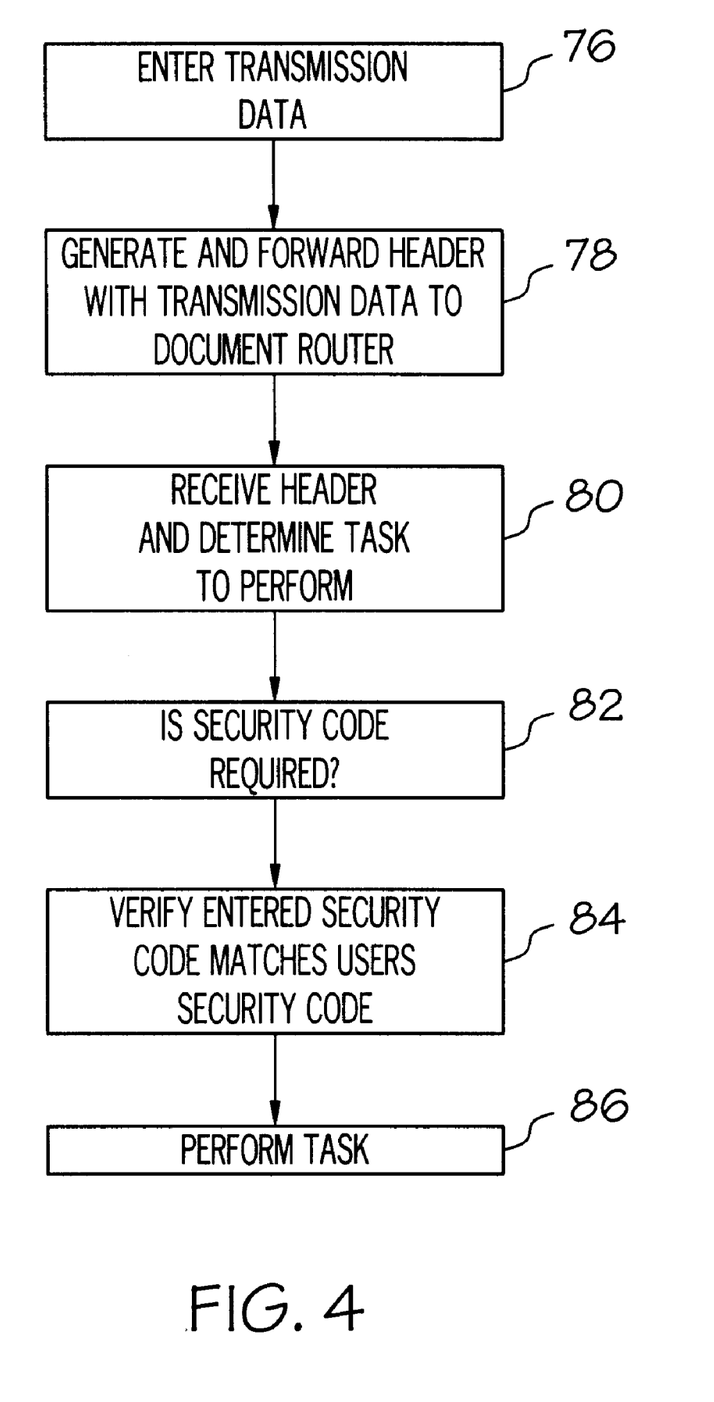
FIG. 4 is a flow diagram showing a general overview of the method and system according to one embodiment of this invention.

FIG. 4 is a flow diagram illustrating general steps associated with generating in a headerless apparatus a communications header for use in the routing of a message according to one embodiment of this invention. At block 76, a user enters the transmission data via keypad 31. At block 78, processing module 40 receives the entered data, generates a communications header, and inserts the transmission data into the communications header. The communications header can comprise any suitable format, as long as document router 60 understands the format.

According to one embodiment of this invention, communication between processing module 40 and document router 60 is accomplished through the use of transmission packets, such as NetWare Core Protocol (NCP) packets. The NetWare Core Protocol allows the definition and extension of native NCP functionality through a registration process. A software module can register NCPs which are not part of the native NCP environment, which can be used by processing module 40 and document router 60 for intercommunication over the network. In other networking environments, mechanisms are similarly provided and known to those skilled in the art for communicating information among software modules in different apparatus such as scanner 30 and network server 32.

Processing module 40 forwards the communication header and scanned image to document router 60 via an NCP. At block 80, document router 60 receives the packet and extracts the communications header. Document router 60 determines which task of a plurality of different routing tasks to perform. This determination can comprise examining the user identifier entered in the transmission data, accessing a table such as directory services 66, and determining a default routing task associated with the user identifier. According to another embodiment of this invention, a function code can also be entered by the user which specifies a particular routing task to perform.

At block 82, document router 60 determines whether the requested routing task requires a security code. If one is required, at block 84 document router 60 retrieves from directory services 66 the security code value associated with the respective user and verifies that the security code in the communications header matches the security code in directory services 66 for that particular user. If the security code is invalid, the routing task will not be performed. If an invalid security code were entered, document router 60 can generate a network message or an electronic mail message and communicate the message to a network administrator. If the security code is valid, at block 86 the requested routing task is performed.

According to one embodiment of this invention, the communication between processing module 40 and document router 60 are achieved by registering an NCP, and defining and using the following five subfunctions:

DRSInitiateAutoRouteTransfer

This NCP is used to verify user-entered transmission data and to initialize a file handle for the scanning apparatus, such as scanner 30, to utilize. Document router 60, upon reception of this NCP, will recognize the format of the transmission data field and verify that the format is correct. Any suitable format can be used, as long as processing module 40 and document router 60 are aware of the particular format utilized. The format can comprise various subfields of transmission data, such as a user identifier field, a function code field, an argument field, a security code field, and a document identifier field. The user can identify the beginning and end of the various fields by using delimiters, such as a "#", or a "*". Thus, a user could enter via keypad 36 at scanner 30 a string such as "#5434*1204*4476#", indicating that user 5434 would like routing task 12 to be performed, that 04 is being passed as an argument, and that the user's security code is 4476. In another embodiment, the scanner can lead the user through a series of questions, or menus, and load the data entered by the user in response to the questions into a fixed length string, such as "543412044476" as long as document router 60 understands the layout of the string. Document router 60 will determine whether the entered user identifier in the transmission data field exists. If the format is incorrect or if the user identifier does not exist, a completion code of UndefinedUserIdentifier will be returned to scanner 30. Any files associated with this NCP will be stored in a dead letter storage area where an administrator can review the messages and determine the appropriate recipient.

To determine whether a user identifier exists, document router 60 preferably accesses a system wide database, such as directory services 70 which has a record, or object for each user of the messaging environment. Directory services 66 can be used to translate the user identifier received in the transmission data field with a network specific user identifier used in the messaging environment.

If the user identifier is valid, and the format is valid, document router 60 determines whether a function code has been entered. If a function code was not entered, directory services 66 is accessed to determine if a default function code identifying a particular routing task has been provided for this particular user. If the function code associated with this message requires a security code, document router 60 will verify that the security code entered in the transmission data field matches the security code contained in directory services 66 for this particular user. If the security code is invalid, the routing task associated with the function code will not be performed. If an invalid security code were entered, document router 60 can generate a network message or electronic mail message and communicate the message to a network administrator.

Maintenance of directory services 66 can be achieved through an administration program which allows the entry, deletion, and modification of the various attributes associated with a user of the messaging environment. Such a directory services administration program can be responsible for creating user identifiers, security codes, and default function codes, and any other relevant information for use with document router 60. The precise code necessary to generate such a utility will vary depending on the network operating system and directory APIs of directory services 66. If directory services 66 comprises a relatively simple, editable file, a conventional file editor can be used to add, delete and modify users of messaging environment 20.

If the user identifier, and function code (if entered) in the communications data field are properly verified, document router 60 will accumulate the number of file handles requested by digital copier 28. The number of file handles will correspond to the number of messages received. If possible, the files associated with the file handles will be created in the appropriate location, depending upon the dynamic function code. For example, if the dynamic function code involves routing a scanned document from scanner 30 to an e-mail system, the files will be created in the data store of the e-mail system. If the dynamic function code requires routing of a scanned image to a persistent storage location, then the files will be created in a path associated with that particular user. The path for a particular user can be specified in directory services 66. If the ultimate location of the files is another server, the files can initially be created in an inbound directory associated with digital copier 28, and then transferred to the appropriate server by document router 60 upon receipt of a DRSAutoRouteDocumentsTransferred NCP, as described in more detail below.

If the requested number of file handles cannot be obtained, document router 60 can return an OutOfHandles completion code to scanner 30 or digital copier 28. The files associated with the file handles will be created using a file extension according to the TypeOfFiles field in the NCP. If the dynamic function code specifies that the image should be printed, the files are created in the directory associated with network print facilities.

To maintain state information between document router 60 and scanner 30 or digital copier 28, document router 60 creates a storage location in memory upon receipt of each DRSInitiateAutoRouteTransfer NCP, and loads the storage location with the information received in the transmission data, as well as any information document router 60 will need when processing future NCPs relating to this routing task. Document router 60 generates a transferID which is a reference to the storage location created for this NCP, and the transferID is placed in the NCP response along with the obtained file handles. This transferID will be included by scanner 30 or digital copier 28 in subsequent NCP packets, and will be used by document router 60 to determine the state of this routing request.

The layout of a DRSInitiateAutoRouteTransfer NCP according to one embodiment of this invention is set forth below:

| | |
|---|---|
| NCP sub function code | 00 |
| Input Parameters | Size |
| Transfer Type | Byte (Client = 0, Server = 1) This indicates the entry of an external destination, such as a facsimile processor, or network IP address, to which this message should be transferred. If set to server, the phone number and outbound communications data field needs to be filled out. |
| Number of Files | Byte |
| Type of Files | Word (LoHi) |
| Xresolution */ | Word (LoHi) /* DPI resolution X |
| Yresolution */ | Word (LoHi) /* DPI resolution Y |
| Inbound communications data field | Byte[21] |
| Phone/IP/Other Number | Byte[41] Null if Client) |
| Outbound communications data field if Server) | Byte[21] Null if Client, Optional |
| Output Parameters | Size |
| Completion Code | Byte |
| TransferID | Long (LoHi) |
| File Handle | Long (LoHi) |
| Nth File Handle | Long (LoHi) |
| Completion Codes | Value |
| Successful | 0 |
| Undeliverable | 10 |
| UndefinedUserIdentifier | 11 |
| Previous request not complete | 12 |
| OutOfHandles | 129 |
| Failure | FF |

| *Type of files numbers | | |
|---|---|---|
| File Type | Number | Extension |
| Unknown | 0 | |
| TIF 3 | 1 | .tif |
| GIF | 2 | .gif |
| Paintbrush | 3 | .pcx |
| PostScript | 4 | .ps |
| PCL | 5 | .pcl |
| Envoy | 6 | .evy |
| text | 7 | .txt |
| Bit Map | 8 | .bmp |
| WordPerfect Doc | 9 | .wpd |
| WordPerfect Graphic | 10 | .wpg |
| Multi Page Paint Brush | 11 | .dcx |
| Fax group 3 | 12 | .fax |

Although user identifiers are generally referred to herein as being associated with a user of the messaging environment, network-attached apparatus can also be provided a user identifier, allowing the direct routing of a message from one network-attached device to another. For example, a user at scanner 30 can enter the user identifier associated with a particular printer to direct the scanned image directly to that printer.

DRSAutoRouteDocumentsTransferred

This NCP is sent by scanner 30 or digital copier 28 after the files associated with the input image have been copied to the appropriate location via the file handles returned in the InitiateAutoRouteTransferNCP. Such copying can be achieved through the use of a WriteToFileHandle NCP, or any other mechanism for communicating the message from scanner 30 or digital copier 28 to the files referenced by the file handles. This NCP informs document router 60 to begin routing the documents to the correct location. Document router 60 verifies that the transferID included in this NCP is valid. If the transferID is invalid, document router 60 generates an InvalidTransferID completion code and stops processing the NCP. If the transferID is valid, document router 60 routes the documents according to the function code contained in the structure referenced by the transferID.

The files associated with the file handles will be closed by document router 60. Any errors occurring during the closing of the files will generate a SomeFilesInUse completion code. If this occurs, the files associated with this particular transferID will be moved to a malformed request storage area. For a function code of 00 or 01, a mail message for the appropriate e-mail system will be generated. The mail message will be directed to the e-mail address corresponding to the user identifier in the communications data field. The mechanism for generating an e-mail message is typically documented for each vendor's e-mail system and is available from the e-mail vendor. An e-mail translation service 62 can be provided as an interface between document router 60 and different e-mail systems. Such an e-mail translation service are known to those skilled in the art, and are frequently utilized where various e-mail system are supported on a server. E-mail translation service 62 provides a common interface to modules such as document router 60 and can translate a generic message from document router 60 to the format required by any desired e-mail system. E-mail translation service 62 can also retrieve a message from any e-mail system, and convert the message from the respective e-mail format to a common, generic format understandable by document router 60.

If a function code of 02 is specified, an e-mail message will be generated with a listing of the location of the files associated with this request. The files will be stored in a location specified in directory services 66 for this particular user identifier. If a function code of 03 is specified, the files can be transferred to an appropriate network print facility. The network print facility will be responsible for converting the files into a format suitable for printing. If a function code of 29 is encountered, the files will be placed in a local data store and await retrieval by a DRSCheckForAutoRouteDocWaiting NCP looking for files in this location.

The layout of a DRSAutoRouteDocumentsTransferred NCP according to one embodiment of this invention is set forth below:

| | |
|---|---|
| NCP sub function code | 01 |
| Input Parameters | Size |
| TransferID | Long (LoHi) |
| Write Code | Byte |
| Output Parameters | Size |
| Completion Code | Byte |
| Completion Code | Value |
| Successful | 0 |
| InvalidTransferID | 13 |
| FileCopyNotCompleted | 14 |
| SomeFilesInUse | 141 |
| I/OLockError | 162 |
| Failure | FF |

DRSCheckForAutoRouteDocWaiting

This NCP is communicated by digital copier 28 to document router 60 to determine if files exist in the local data store associated with the specified user which need to be transferred to digital copier 28. Document router 60 will then determine if any documents are awaiting transfer to this user. If some documents are awaiting transfer, a transferID will be generated and communicated to digital copier 28. If no documents are awaiting transfer, a completion code of NoDocumentsWaiting will be returned.

The layout of a DRSCheckForAutoRouteDocWaiting NCP according to one embodiment of this invention is set forth below:

| | |
|---|---|
| NCP sub function code | 02 |
| Input Parameters | Size |
| Output Parameters | Size |
| Completion Code | Byte |
| TransferID | Long (LoHi) |
| Remaining Transfers | Long (LoHi) |
| Number of Files | Byte |
| Completion Code | Value |
| Successful | 0 |
| NoDocuments Waiting | 9 |
| Failure | FF |

DRSReceiveAutoRouteDocument

This NCP is sent from digital copier 28 to document router 60 to obtain from document router 60 the list of file handles of documents waiting to be transferred from the local data store to digital copier 28. This NCP can be used after a response to a DRSCheckForAutoRouteDocWaiting NCP indicated that documents are waiting. Document router 60 will verify that the transferID in the NCP is a valid outstanding transferID. If it is not, document router 60 will generate an InvalidTransferID completion code. If the transferID is valid, document router 60 will return the file handles of the files waiting to be transferred. Document router 60 will then fill in the output parameters for the NCP response.

The layout of a DRSReceiveAutoRouteDocument NCP according to one embodiment of this invention is set forth below:

| | |
|---|---|
| NCP sub function code | 03 |
| Input Parameters | Size |
| TransferID | Long (LoHi) |
| Output Parameters | Size |
| Completion Code | Byte |
| Number of Files | Byte |
| Type of Files | Word |
| Xresolution | Word /* DPI resolution X */ |
| Yresolution | Word /* DPI resolution Y */ |
| Phone/IP/Other Number | Byte[41] |
| Outbound Autoroute Code | Byte[21] |
| First File Handle | Long (LoHi) |
| Nth File Handle | Long (LoHi) |
| Completion Code | Value |
| Successful | 0 |
| InvalidTransferID | 13 |
| Failure | FF |

DRSAutoRouteReceiveComplete

After digital copier 28 copies the files associated with the file handles returned in the DRSReceiveAutoRouteDocument NCP, the DRSAutoRouteReceiveComplete NCP is sent from digital copier 28 to document router 60 to inform document router 60 that the files have been transferred. The files can be transferred to digital copier 28 via a ReadFileByHandle NCP, or other mechanism for file transfer known to those skilled in the art. Document router 60 will then close and delete the files associated with the transferID and clean up any available memory, including that required for the storage location maintaining the state information about this request.

The layout of a DRSAutoRouteReceiveComplete NCP according to one embodiment of this invention is set forth below:

| | |
|---|---|
| NCP sub function code | 04 |
| Input Parameters | Size |
| Request ID | Long (LoHi) |
| Read Code | Byte |
| Output Parameters | Size |
| Completion Code | Byte |
| Completion Code | Value |
| Successful | 0 |
| Failure | FF |

While the NCPs described above can be utilized to implement the method and system according to one embodiment of this invention, it is apparent that other NCPs could be defined that would provide similar functionality, and additional NCPs could be defined to provide additional functionality.

Figure 5:
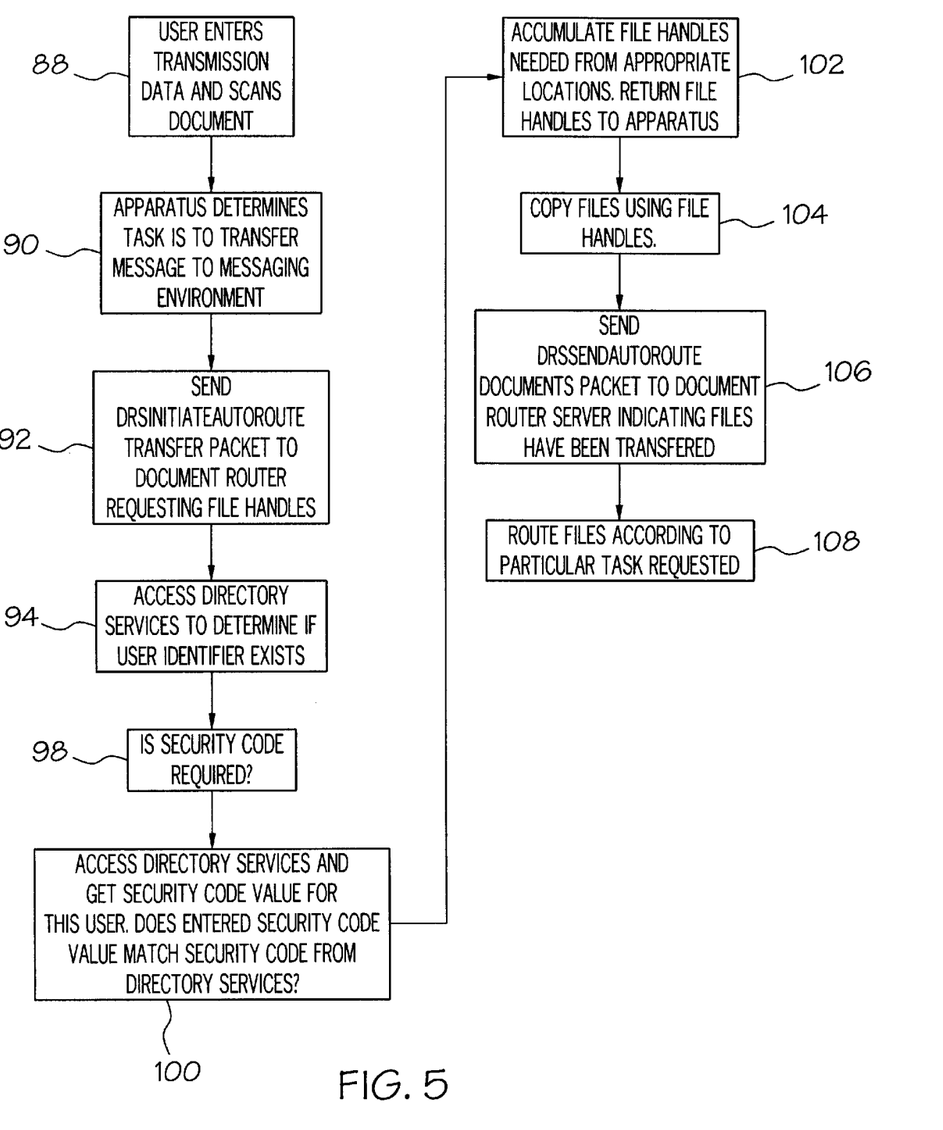
FIG. 5 is a flow diagram showing a process for routing a message from an input peripheral, such as a scanner, to a location within a messaging environment according to one embodiment of this invention.

FIG. 5 is a flow diagram according to one embodiment of this invention for carrying out a routing task requested by a user of scanner 30. The particular routing task requested involves scanning an image with scanner 30, and routing the image to a particular location in messaging environment 20, such as the electronic mailbox of the user. At block 88, the user enters the transmission data, including a user identifier and a function code via keypad 36, and scans the image into scanner 30. At block 90, scanner 30 uses the user-entered transmission data to determine what routing task was requested. Scanner 30 then generates a communications header, and transfers the transmission data to the communications header. At block 92, scanner 30 generates a DRSInitiateAutoRouteTransfer NCP packet and communicates the NCP to document router 60 requesting a file handle. At block 94, document router 60 extracts the transmission data from the header in the NCP and accesses directory services 66 to determine if the user identifier which was entered is a valid user identifier. At block 98, document router 60 determines whether a security code value is required for this particular routing task. If a security code value is required, document router 60 verifies that the transmission data contains a security value. At block 100, document router 60 accesses directory services 60 and retrieves the security code value associated with the user. If the security value from directory services 60 does not match the security value entered in the transmission data, document router 60 terminates the NCP.

At block 102, if the security values do match, document router 60 obtains a file handle from the appropriate location. In this example, the requested routing task relates to transferring the scanned document to the electronic mailbox of the user, and thus document router 60 obtains the file handle from the data store associated with electronic mail system 64. Document router 60 allocates a structure to maintain state information about this request, generates a transferID referencing the structure, and returns the file handle and transferID to scanner 30 in a response NCP. At block 104, scanner 30 copies the document to the respective location using the returned file handle. After the document is copied, at block 106, scanner 30 creates and sends to document router 60 a DRSSendAutoRouteDocuments NCP indicating that the file has been transferred. At block 108, upon receipt of this NCP, document router 60 routes the file as a function of the particular routing task, in this example, to electronic mail system 64. This step can involve generating an electronic mail message listing the location of the document, and forwarding the message via e-mail translation service 62 to the appropriate electronic mailbox. According to another routing task, this can involve attaching the file as an attachment to an electronic mail message and communicating that message via e-mail translation service 62 to an electronic mailbox.

Figure 6:
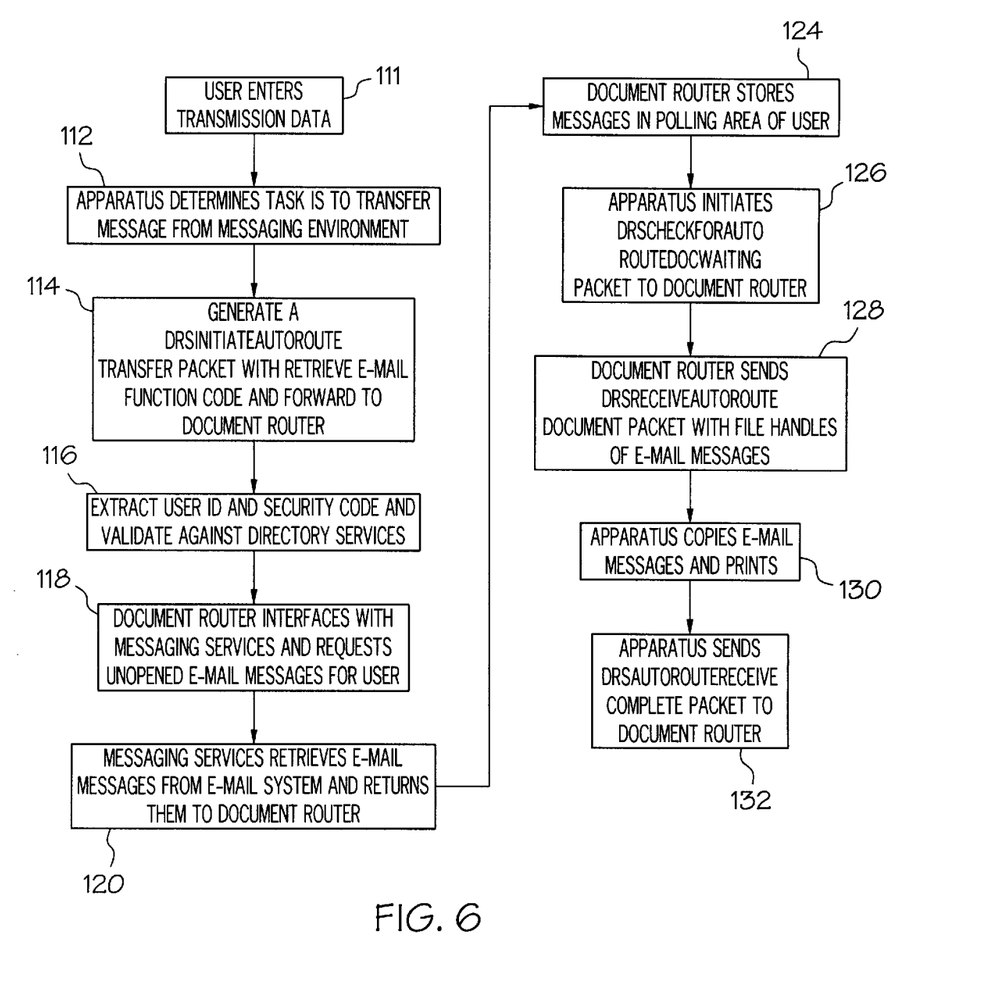
FIG. 6 is a flow diagram showing a process for routing a message from a messaging environment to an output peripheral, such as a digital copier, according to one embodiment of this invention.

FIG. 6 is a flow diagram according to another embodiment of this invention for carrying out a routing task requested by a user of digital copier 28. The desired routing task is for messaging environment 20 to transfer all unopened e-mail messages associated with the user from electronic mail system 64 to digital copier 28. At block 111, the user enters transmission data including a user identifier, the appropriate function code and a security code. At block 112, processing module 40 obtains the transmission data and generates a header, and enters the transmission data into the header. At block 114, processing module 40 generates a DRSInitiateAutoRouteTransfer NCP and forwards the NCP to document router 60. At block 116, document router 60 extracts the user identifier, function code and security code from the header. Document router 60 verifies that the user-entered security code matches the security code in directory services 66 for this user. At block 118, document router 60 interfaces with e-mail translation service 62 and requests unopened e-mail messages for the respective user. E-mail translation service 62, at block 120, retrieves e-mail messages for this user from e-mail system 64 and returns the messages to document router 60. At block 124, document router 60 stores the e-mail messages in the polling area associated with the respective user. The particular polling area for each user can be designated in directory services 66. At block 126, digital copier 28 initiates a DRSCheckForAutoRouteDocWaiting NCP to document router 60 to determine if any messages exist in the polling area associated with this user. At block 128, document router 60 returns a DRSReceiveAutoRouteDocument NCP with the file handles of the e-mail messages located in the polling area of the user.

At block 130, digital copier 28 copies the e-mail messages associated with the returned file handles and prints the messages. At block 132, digital copier 28 sends a DRSAutoRouteReceiveComplete NCP to document router 60 which closes and removes the messages from the polling area and releases any memory associated with the files.

Figure 7:
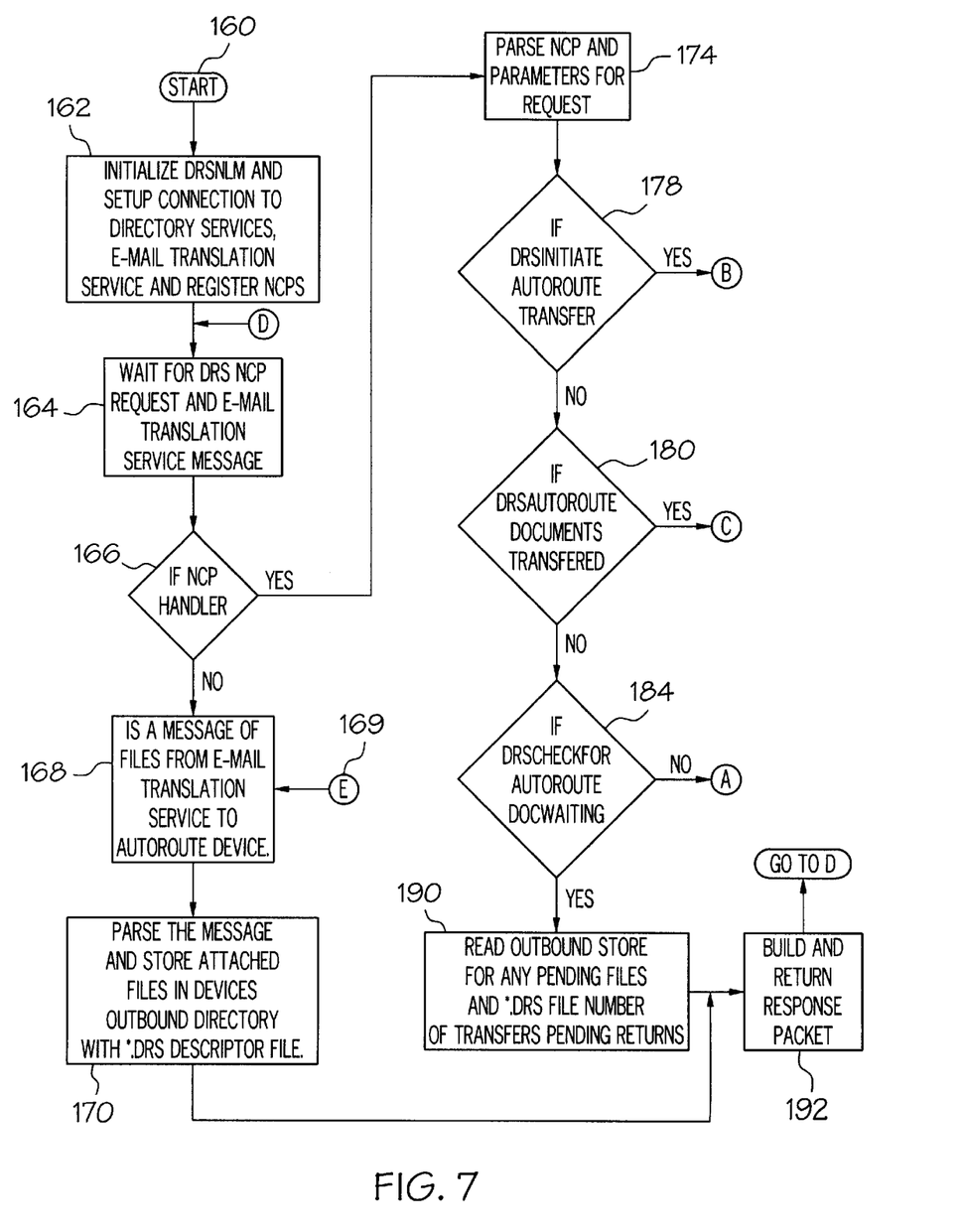
FIGS. 7–9 are flow diagrams illustrating a document router according to one embodiment of this invention.
Figure 8:
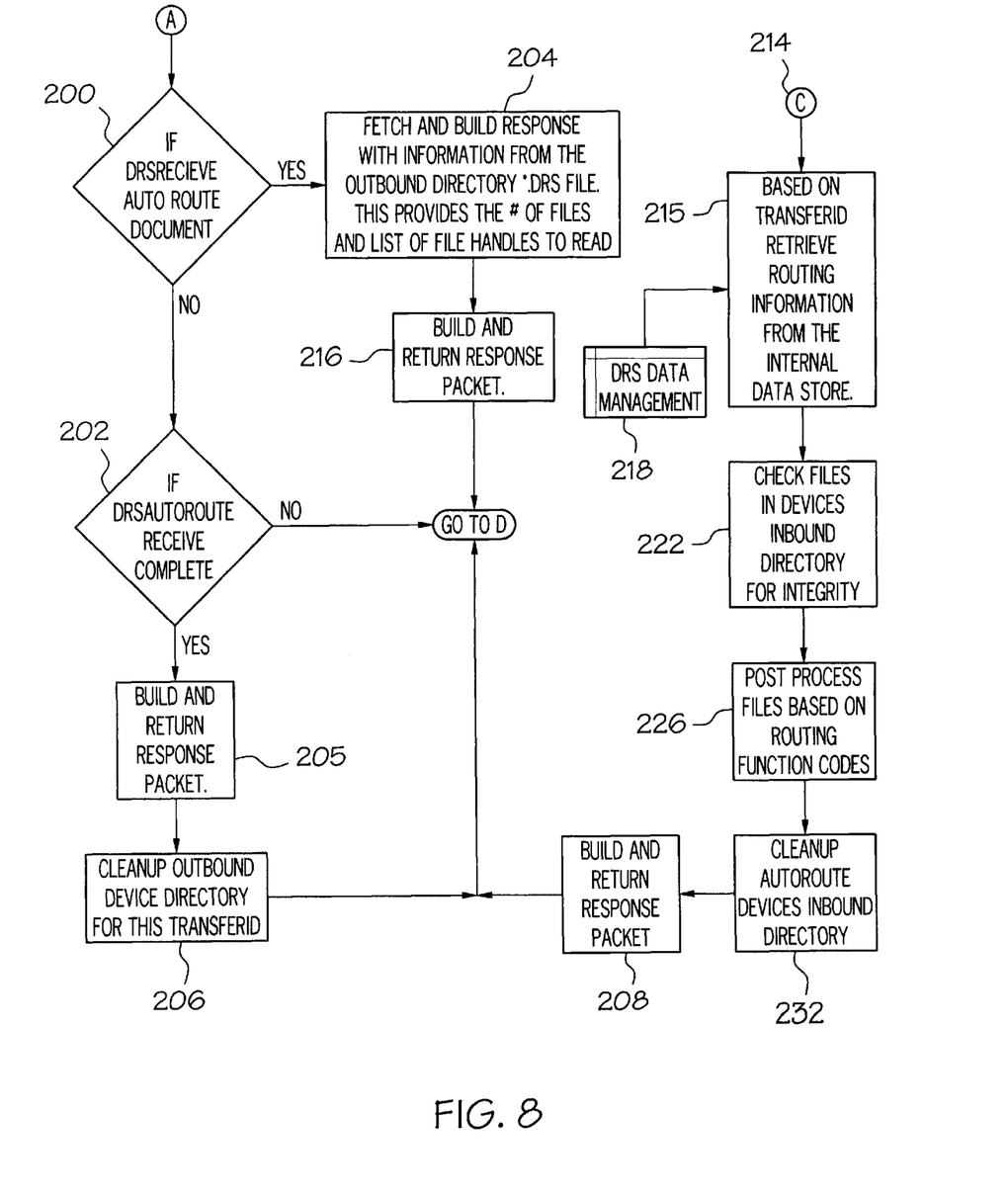
Figure 9:
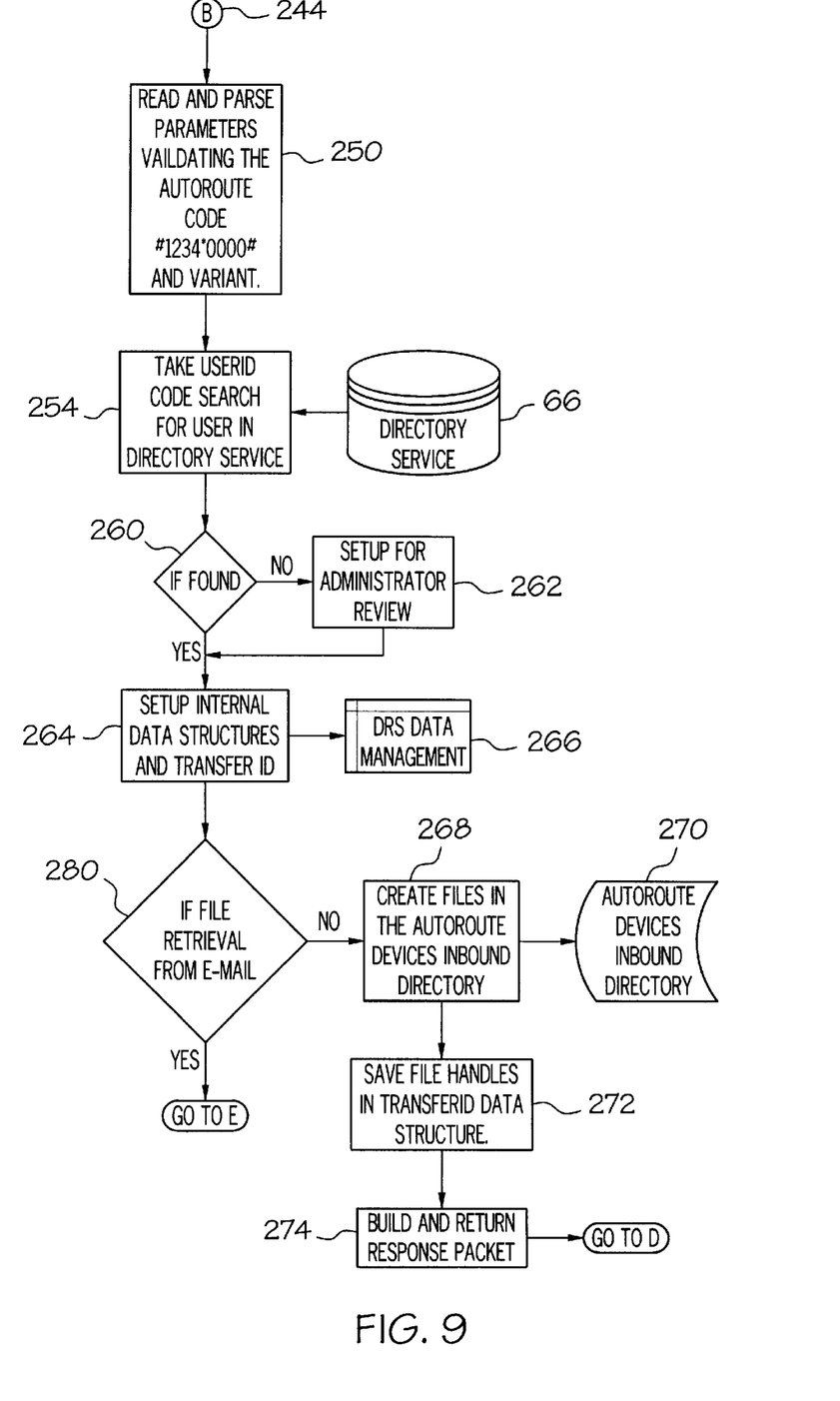

FIGS. 7–9 are flow diagrams illustrating the operation of document router 60 according to one embodiment of this invention. The diagrams will be described with regard to digital copier 28. At block 160, document router 60 is initiated. At block 162, a connection to directory services 66 is initialized, as well as a connection to e-mail translation service 62. Document router 60 also registers the NCPs described above, for use in communicating with digital copier 28. At block 164, document router 60 waits for either an NCP packet or a message from e-mail translation service 62. At block 166, either a message or an NCP arrives. If an NCP arrives, then at block 174 document router 60 parses the NCP and the parameters associated with the NCP. If, at block 178, the NCP is a DRSInitiateAutoRouteTransfer NCP, control transfers to block 244 on FIG. 9. Referring now to FIG. 9, at block 250, document router 60 reads the user-entered transmission data, such as the user identifier, function code, and security code from the NCP. At block 254, document router 60 accesses directory services 66 and determines if the user identifier exists in messaging environment 20. If, at block 260, the user identifier is located, then at block 264 document router 60 initializes an internal data structure and generates a transferID referencing the data structure. The parameters in the NCP are transferred to the initialized data structure. DRS data management 266 represents the storage location, preferably in memory, of the internal data structures used by document router 60. If at block 260, the user identifier is not found, then at block 262, the user identifier is replaced with the user identifier associated with the system administrator, to divert the message to the administrator where the message can later be viewed to determine the correct recipient.

If, at block 280, the requested function is an e-mail retrieval request, document router 60 requests the e-mail messages from e-mail translation service 62, and control branches to block 169 on FIG. 7. At block 168 document router 60 determines that the message is from e-mail translation service 62. At block 170, the respective files associated with the e-mail message are stored in the outbound directory associated with digital copier 28. At block 192, document router 60 builds and returns a response NCP to digital copier 28.

Referring again to FIG. 9, if at block 280 the requested task is not an e-mail message retrieval, then at block 268 file handles are obtained, and files are created in the inbound directory associated with digital copier 28. Document router 60 preferably creates both an inbound directory and an outbound directory for each digital copier 28. At block 272, document router 60 stores the file handles in the data structure referenced by this transferID. At block 274, a response NCP is generated and returned to digital copier 28. At block 276, control returns to block 164 of FIG. 7 to await arrival of another message.

Referring again to FIG. 7, if at block 180, a DRSAutoRouteDocumentsTransferred NCP was received, control branches to block 214 of FIG. 8. At block 216, document router 60 retrieves the structure associated with the transferID in the NCP from DRS data management 218. This structure includes the state information required by document router 60 to maintain the current status of this routing request.

At block 222, document router 60 verifies that the files in the inbound directory of digital copier 28 have been closed.

At block 226, the files are processed based on the routing task associated with the respective function code. For example, if the routing task involves copying files to the designated user's document storage area, document router 60 transfers the files to the appropriate directory. If an e-mail notification of the location of the files is required, document router 60 will communicate with e-mail translation service 62 and create and communicate a message to the appropriate electronic mailbox of the user indicating the location of the files. If, for example, the routing task involves printing the messages, document router 60 communicates with the network print facilities to print the files. At block 232, the files are removed from the inbound directory of digital copier 28. At block 208, document router 60 generates and returns a response NCP and communicates it to digital copier 28. Control returns to block 164 of FIG. 7 where document router 60 awaits the next message.

If, at block 184 on FIG. 7, a DRSCheckForAutoRouteDocWaiting NCP is received, then at block 190 document router 60 reads the outbound directory associated with digital copier 28 for any pending files. At block 192, document router 60 builds a response NCP and returns it to digital copier 28, with the number of files located in the outbound directory, or, if no such files exist, a NoDocumentsWaiting completion code is returned. Control then returns to the outer loop at block 164 where document router 60 awaits the next message. If, at block 200 of FIG. 8, a DRSReceiveAutoRouteDocument NCP is received, then at block 204, document router 60 obtains the file handles of the files in the outbound directory of digital copier 28 and returns the file handles in a response NCP at block 216. If, at block 202 a DRSAutoRouteReceiveComplete NCP is received, then at block 205 document router 60 returns a response NCP, and at block 206 cleans up and removes from the outbound directory of digital copier 28 the files associated with this transferID. Control returns to block 164 where document router 60 awaits another message.

The foregoing description of preferred embodiments of the invention have been presented for purposes of illustration and description. It is not intended to be exhaustive or limit the invention to the precise form disclosed. Obvious modifications or variations are possible in light of the above teachings. It is intended that the scope of the invention be defined by the claims appended hereto.

What is claimed is:

1. A method for generating in a headerless apparatus a communications header for use in the routing of a message, comprising:

coupling the headerless apparatus to a computer network without using a client computer to perform said coupling;

providing the headerless apparatus with an input interface;

providing a communications module operative to receive from the input interface user-entered transmission data, wherein the communications module does not comprise a client computer;

generating in the communications module a communications header;

inserting the user-entered transmission data in the communications header, wherein the user-entered transmission data represents a particular routing task;

transferring the communications header to a document routing module;

determining which particular routing task from a plurality of routing tasks is represented by the user-entered transmission data, wherein the plurality of routing tasks comprises:

routing a message from the apparatus to an electronic mailbox within the network, and routing a message to the apparatus from an electronic mailbox within the network; and performing the particular routing task which is determined to be represented by the user-entered transmission data.

2. A method according to claim 1, wherein the user-entered transmission data comprises a user identifier which represents the particular routing task, and wherein the document routing module determines which particular task of the plurality of routing tasks is represented by the user identifier, and performs the particular routing task.

3. A method according to claim 2, wherein the document routing module determines which particular routing task is represented by the user identifier by accessing a table containing a plurality of user identifiers, each user identifier having a task code identifying the particular routing task represented by the respective user identifier.

4. A method according to claim 1, wherein the user-entered transmission data comprises a first user identifier and a function code, and the function code identifies the particular routing task of the plurality of routing tasks to perform.

5. A method according to claim 4, wherein the user-entered transmission data further comprises a first security code, and wherein the document routing module validates the first security code against a table lookup security code before performing the particular routing task.

6. A method according to claim 5, wherein the validation comprises accessing a table containing a plurality of user identifiers, each user identifier have a table lookup security code associated therewith, extracting from the table the table lookup security code associated with the first user identifier, and determining if the table lookup security code matches the first security code.

7. A method according to claim 1, wherein the user-entered transmission data comprises a user identifier, and wherein the particular routing task comprises retrieving a message from an electronic mailbox of a user associated with the user identifier, and transferring the message to the headerless apparatus.

8. A method according to claim 1, wherein the user-entered transmission data comprises a user identifier, and wherein the the particular routing task comprises retrieving a message from an electronic mailbox of a user associated with the user identifier, and transferring the message to the headerless apparatus.

9. A method according to claim 1, wherein the headerless apparatus comprises one of a scanner and a digital copier.

10. A system for integrating a scanner into a messaging environment, comprising:

a scanner;

an input mechanism coupled to the scanner;

said scanner having a processing module in communication with said input mechanism, said processing module operative to receive transmission data from said input mechanism, generate a header, and insert the transmission data into said header, wherein the transmission data represents one particular routing task from a plurality of routing tasks, wherein the plurality of routing tasks comprises routing a message from the scanner to a location within the messaging environment, and routing a message to the scanner from a location within the messaging environment;

a message routing module located in the messaging environment and coupled to said scanner;

said processing module operative to communicate the header to the message routing module without using a client computer, said routing module operative to determine the particular routing task represented by the transmission data, and at least one of said routing module and processing module being operative to perform the particular routing task.

11. A system according to claim 10, wherein the transmission data comprises a user identifier.

12. A system according to claim 11, further comprising a directory services, and wherein the message routing module is operative to access the directory services and retrieve a function code identifying the particular routing task to be performed as a function of the user identifier.

13. A system according to claim 10, wherein the transmission data further comprises a function code, the function code being operative to identify the particular routing task to perform.

14. A system according to claim 10, wherein the processing module is operative to communicate an input message to the message routing module, and the particular routing task comprises routing the input message to a location within the messaging environment.

15. A system for integrating a digital copier into a messaging environment, comprising:

a digital copier;

an input mechanism coupled to the digital copier;

said digital copier having a processing module in communication with said input mechanism, said processing module operative to receive transmission data from said input mechanism, generate a header, and insert the transmission data into said header, wherein the transmission data represents one particular routing task from a plurality of routing tasks, wherein the plurality of routing tasks comprises routing a message from the copier to a location within the messaging environment, and routing a message to the copier from a location within the messaging environment;

a message routing module located in the messaging environment and coupled to said digital copier;

said processing module operative to communicate the header to the message routing module without using a client computer, said routing module operative to determine the desired routing task represented by the transmission data, and at least one of said routing module and processing module being operative to perform the particular routing task.

16. A system according to claim 15, wherein the transmission data comprises a user identifier.

17. A system according to claim 16, further comprising a directory services, and wherein the message routing module is operative to access the directory services and retrieve a function code identifying the particular routing task to be performed as a function of the user identifier.

18. A system according to claim 15, wherein the transmission data further comprises a function code, the function code being operative to identify the particular routing task to perform.

19. A system according to claim 15, wherein the processing module is operative to communicate an input message to the message routing module, and the particular routing task comprises routing the input message to a location within the messaging environment.

20. A system according to claim 15, wherein the processing module is operative to receive a message from the message routing module, and the particular routing task comprises routing a message from a location within the messaging environment to the digital copier.

21. A method according to claim 1, wherein the input interface comprises less than 26 input buttons.

22. A method according to claim 21, wherein the input interface comprises a numeric keypad having ten numeric keys and less than three delimiter keys, and wherein the user-entered transmission data comprises numeric data.

23. A system according to claim 10, wherein the processing module is an integral component of the scanner.

24. A system according to claim 15, wherein the processing module is an integral component of the copier.

25. A method for generating in a headerless apparatus a communications header for use in the routing of a message, comprising:

coupling the headerless apparatus to a network;

providing the headerless apparatus with an input interface;

providing a communications module operative to receive from the input interface user-entered transmission data;

generating in the communications module a communications header;

inserting the user-entered transmission data in the communications header;

transferring the communications header to a document routing module; and performing one of a plurality of different tasks as a function of the user-entered transmission data.

* * * * *